United States Patent
Kremer

(10) Patent No.: US 7,843,549 B2
(45) Date of Patent: Nov. 30, 2010

(54) LIGHT ATTENUATING FILTER FOR CORRECTING FIELD DEPENDENT ELLIPTICITY AND UNIFORMITY

(75) Inventor: Alexander Kremer, Stamford, CT (US)

(73) Assignee: ASML Holding N.V., Veldhoven (NL)

( * ) Notice: Subject to any disclaimer, the term of this patent is extended or adjusted under 35 U.S.C. 154(b) by 715 days.

(21) Appl. No.: 11/752,710

(22) Filed: May 23, 2007

(65) Prior Publication Data

US 2008/0291422 A1 Nov. 27, 2008

(51) Int. Cl.
*G03B 27/68* (2006.01)
*G03B 27/54* (2006.01)
*G03B 27/72* (2006.01)

(52) U.S. Cl. ............................. 355/52; 355/67; 355/71

(58) Field of Classification Search .................... 355/52, 355/53, 55, 67–71; 250/548; 356/399–401
See application file for complete search history.

(56) References Cited

U.S. PATENT DOCUMENTS

| | | | | |
|---|---|---|---|---|
| 6,281,967 B1 * | 8/2001 | Kudo | .............. | 355/67 |
| 6,404,482 B1 * | 6/2002 | Shiraishi | ................... | 355/53 |
| 6,771,350 B2 * | 8/2004 | Nishinaga | .................. | 355/53 |
| 7,173,688 B2 * | 2/2007 | Wiener et al. | ................ | 355/69 |
| 2006/0146309 A1 | 7/2006 | Hult | | |
| 2007/0103665 A1 | 5/2007 | Zimmerman et al. | | |
| 2007/0109518 A1 | 5/2007 | Wiener et al. | | |

* cited by examiner

*Primary Examiner*—Hung Henry Nguyen
(74) *Attorney, Agent, or Firm*—Sterne, Kessler, Goldstein & Fox P.L.L.C.

(57) ABSTRACT

Ellipticity in an illumination beam may be corrected by measuring an ellipticity of the illumination beam and substantially eliminating the ellipticity using a light attenuating filter at a defocus position of the illumination beam, wherein the light attenuating filter has a two-dimensional pattern that compensates for ellipticity variations in the illumination beam. The light attenuating filter may stand alone, or the filter may be combined with a uniformity correction system, such that it corrects both uniformity and ellipticity. In one embodiment, the light attenuating filter is printed with an assembly of microscopic dots according to the two-dimensional pattern.

10 Claims, 9 Drawing Sheets

LIGHT ATTENUATING FILTER FOR CORRECTING FIELD DEPENDENT ELLIPTICITY AND UNIFORMITY

BACKGROUND

1. Field of the Invention

The present invention relates to lithography systems, specifically correcting ellipticity and field uniformity in the illumination beams of lithography scanners.

2. Background Art

Conventional lithography systems include, among other things, an illumination system that produces an illumination beam for exposing a substrate via a patterned reticle. The quality of the illumination is defined by the uniformity of the illuminated field (i.e., the total amount of energy at any point in the field), the uniformity of the pupil (i.e., the energy distribution in the pupil), and the consistency of the energy distribution in the pupils across the field. To quantitatively characterize the energy distribution in the pupil, a generalized parameter called ellipticity is used. FIGS. 7A and 7B further illustrate the concept of ellipticity.

FIG. 7A is an illustration of an ideal beam of light 702 that is focused on a point 704 on a reticle plane 706. Pupil 708 is a cross-section of beam 702, which represents the pupil at a defocus position of the beam. FIG. 7B is a front view of pupil 708. Pupil 708 is annular and has four quadrants. In an ideal beam with no ellipticity, such as beam 702, the energy E is uniformly distributed between all four quadrants. Ellipticity occurs when the energy distribution in the quadrants becomes unbalanced. Specifically, ellipticity may be defined as:

$$\text{Ellipticity} = 100\% \left(1 - \frac{E_1 + E_2}{E_3 + E_4}\right), \quad \text{(Eq. 1)}$$

where $E_1$, $E_2$, $E_3$, and $E_4$ are the energies in each of the respective quadrants (as illustrated by the shaded areas in FIG. 7B).

Ellipticity can affect the degree of exposure of a substrate which, in turn, can cause variations in linewidth dimensions of lithographic patterns and resulting electronic elements formed on the substrate. Where these variations in linewidth dimensions are such that there is a difference between linewidth dimensions for horizontal lines and linewidth dimensions for vertical lines, the condition is referred to as horizontal-vertical (H-V) bias. Because H-V bias can effect the performance of an integrated circuit, methods for improving the control of variations in linewidth dimensions have been the subject of assorted efforts.

One example of a popular conventional lithography system is a step and scan system (sometimes referred to as a scanner). A step and scan system includes an illuminated slit narrower than one exposure field. The system then scans the reticle and wafer synchronously by the slot to expose each field on the wafer. This process is repeated. Because of the nature of the system's operation, radiation energy in the scan direction is integrated, and as a result a dose received on the photo-active coating on the substrate can be non-uniform. Non-uniformity in the dose can cause printing errors and degraded device performance.

Some lithography systems use uniformity correction systems to make the scan-integrated intensity profile uniform. Some of these uniformity correction systems also attempt to correct for ellipticity in the illumination beam. However, these existing systems can only correct average ellipticity across the field. They cannot correct for one or more ellipticity variations across the field. Additionally, when uniformity correction systems are also used to correct ellipticity, differences in trends between ellipticity and uniformity are unaccounted for. For example, beam intensity at the edges of the illumination field in the cross scan direction might be higher than in the center, causing the uniformity correction system to attenuate light only at shallow edges of the field for uniformity correction. At the same time, ellipticity may be higher in the center of the field, meaning that light attenuation would need to extend deeper into the center of the field. Existing systems cannot fulfill both of these functions at once.

What is needed is a system and method for reducing ellipticity in an illumination beam in a manner that is independent from other features of the illumination beam, and that accounts for variations in the angular distribution of light in the illumination beam across an illumination field.

BRIEF SUMMARY

In one example, a light attenuating filter can be used for ellipticity variation correction across the field as well as for uniformity correction across the field. The two functions may be kept independent from each other so that ellipticity variations can be corrected without adversely affecting uniformity, or the two functions may occur in tandem.

The filter is located at a given distance from the focal plane in a defocus position. The distance may be, for example, from approximately 5 mm to approximately 60 mm from the focal plane. The filter may be adjustable. The filter may have a two dimensional pattern (along the X (cross scan) and Y (scan) directions) that reduces overall ellipticity and compensates for ellipticity variations in the field. The pattern may be based on an ellipticity of the illumination beam as measured by a pupil measuring detector in the lithography system. The filter may stand alone, or it may be combined with a uniformity correction system of the lithography system. If it is combined with a uniformity correction system, the two dimensional pattern may include features that correct uniformity errors independently from ellipticity errors.

The total scanned optical density of the filter can be kept the same along the X direction in the entire filter, or it can be manipulated by changing the total scanned optical density at any position in the cross-scan direction (X value). Each of these two cases can result in substantially no effect on the uniformity of the field or, accordingly, an effect on the field uniformity in any desired manner.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Embodiments of the present invention will be described with reference to the accompanying drawings. The drawing in which an element first appears is typically indicated by the leftmost digit(s) in the corresponding reference number.

DETAILED DESCRIPTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

Figure 1:
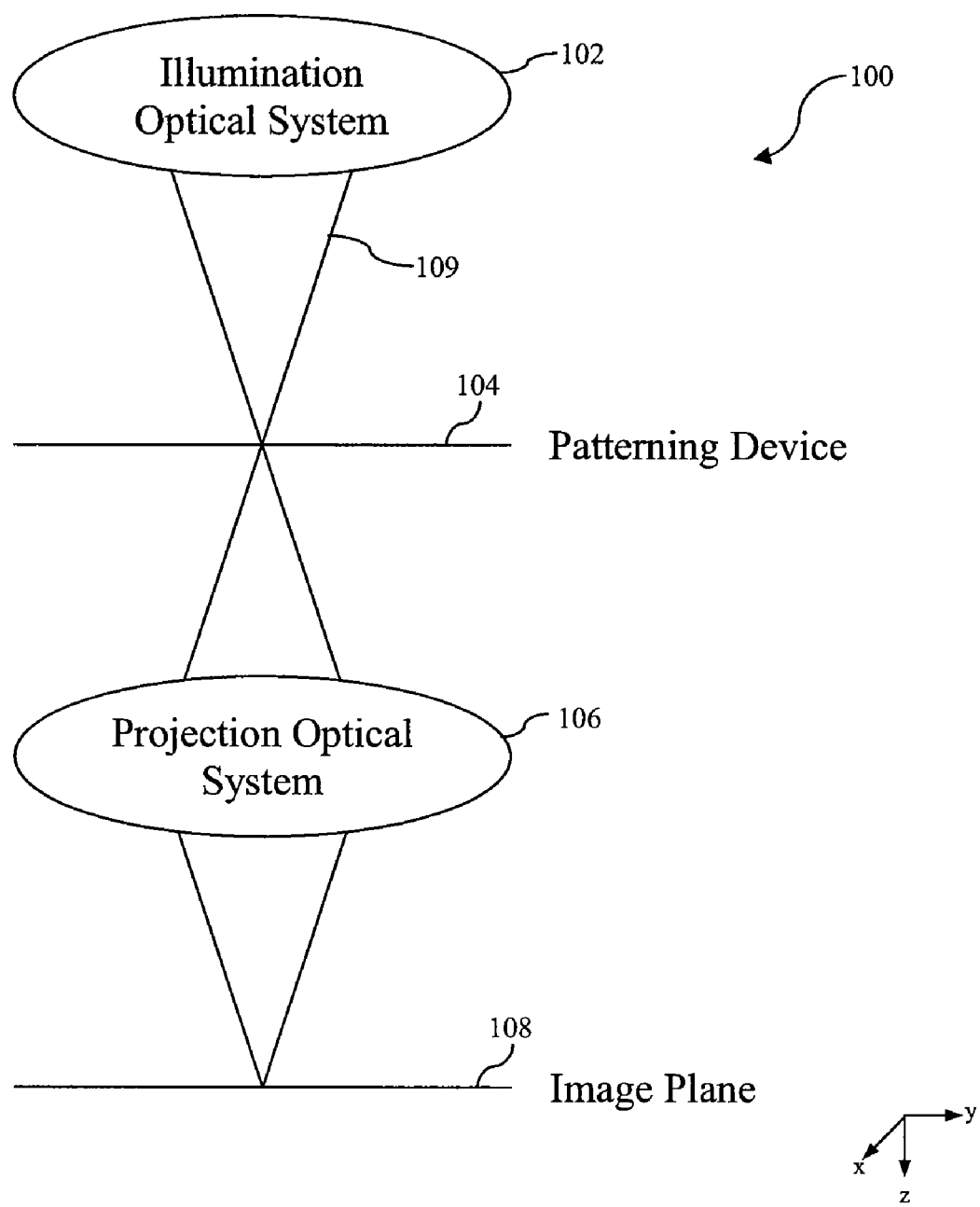
FIG. 1 illustrates a typical lithography scanner.
Figure 7A:
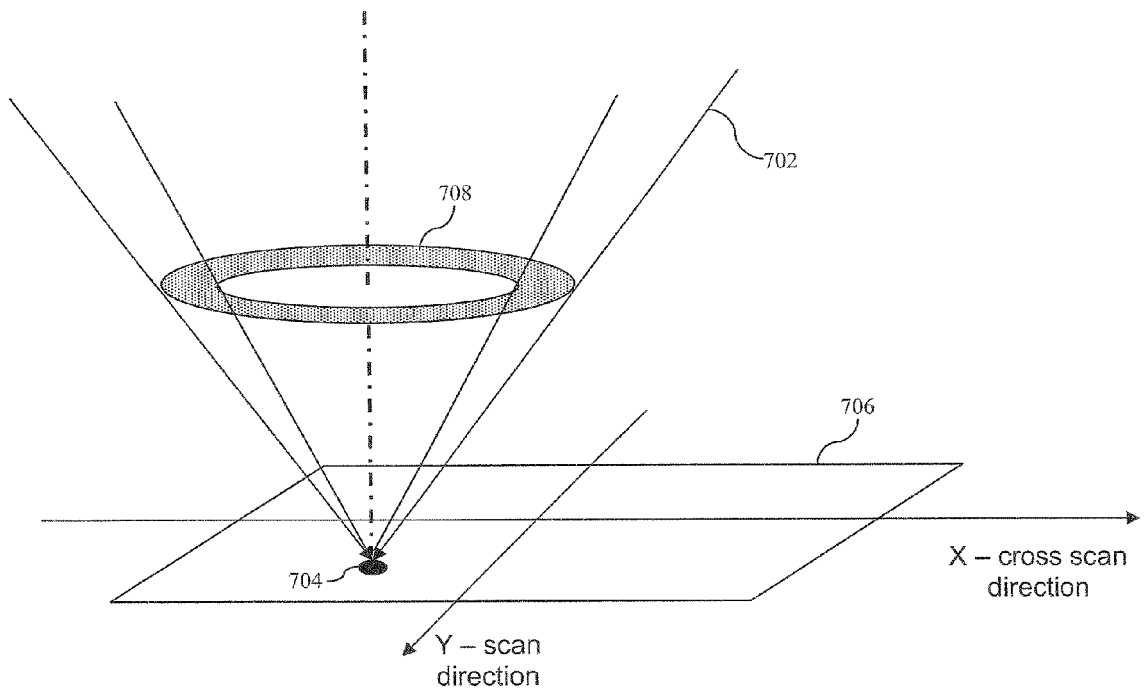
FIGS. 7A and 7B illustrate energy distribution in a pupil.
Figure 7B:
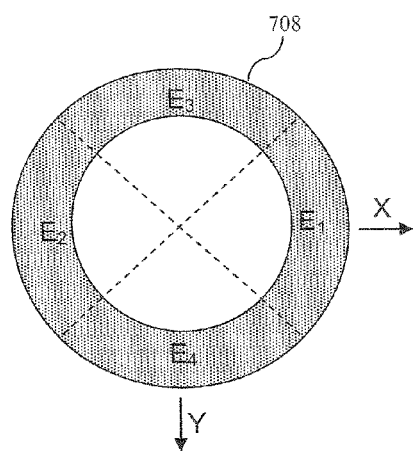

FIG. 1 is an illustration of a typical lithography system 100 having an illumination optical system 102, a patterning device 104 (e.g., a reticle), a projection optical system 106, and an image plane 108. Ideally, illumination optical system 102 produces a beam of light 109 that is uniform at image plane 108. Additionally, beam 109 produced by illumination optical system 102 is ideally incident on image plane 108 (the field) at a range of angles that are predefined in two dimensions, $\theta(x)$ and $\theta(y)$. The range of angles that converges onto the field is controlled by the pupil, which defines an illumination cone. As described with respect to FIG. 7, the angular distribution of light in the pupil is generally referred to as the ellipticity. In a system with no ellipticity, the distribution of light between different angles in the illumination cone (referred to herein as the angular distribution) is constant, and is the approximately the same at each point across the entire illumination field. However, ellipticity errors can cause the distribution of light between different angles in the illumination cone to vary, such that the cone becomes flattened, or more elliptical in shape.

Additionally, the ellipticity in the pupil can vary across the field. Variation of ellipticity is a common phenomenon, especially in very high numerical aperture (NA) lithography systems. However, as discussed above, existing systems for altering ellipticity either correct only average ellipticity or cannot correct variations of ellipticity without affecting other aspects of a light beam.

For example, one existing system corrects for ellipticity by inserting spokes or "fingers" into the pupil. This ellipticity corrector is located approximately in the pupil plane of the illuminator, and can only correct average ellipticity across the field. It cannot correct for variations of ellipticity present in the field.

Another existing system uses a uniformity adjustment device for adjustments to uniformity as well as to ellipticity variations. The problem with this approach is that uniformity is then tied with ellipticity, even though the uniformity may have a completely different trend than ellipticity and the uniformity adjustment device cannot completely fulfill both functions at once.

Figure 2:
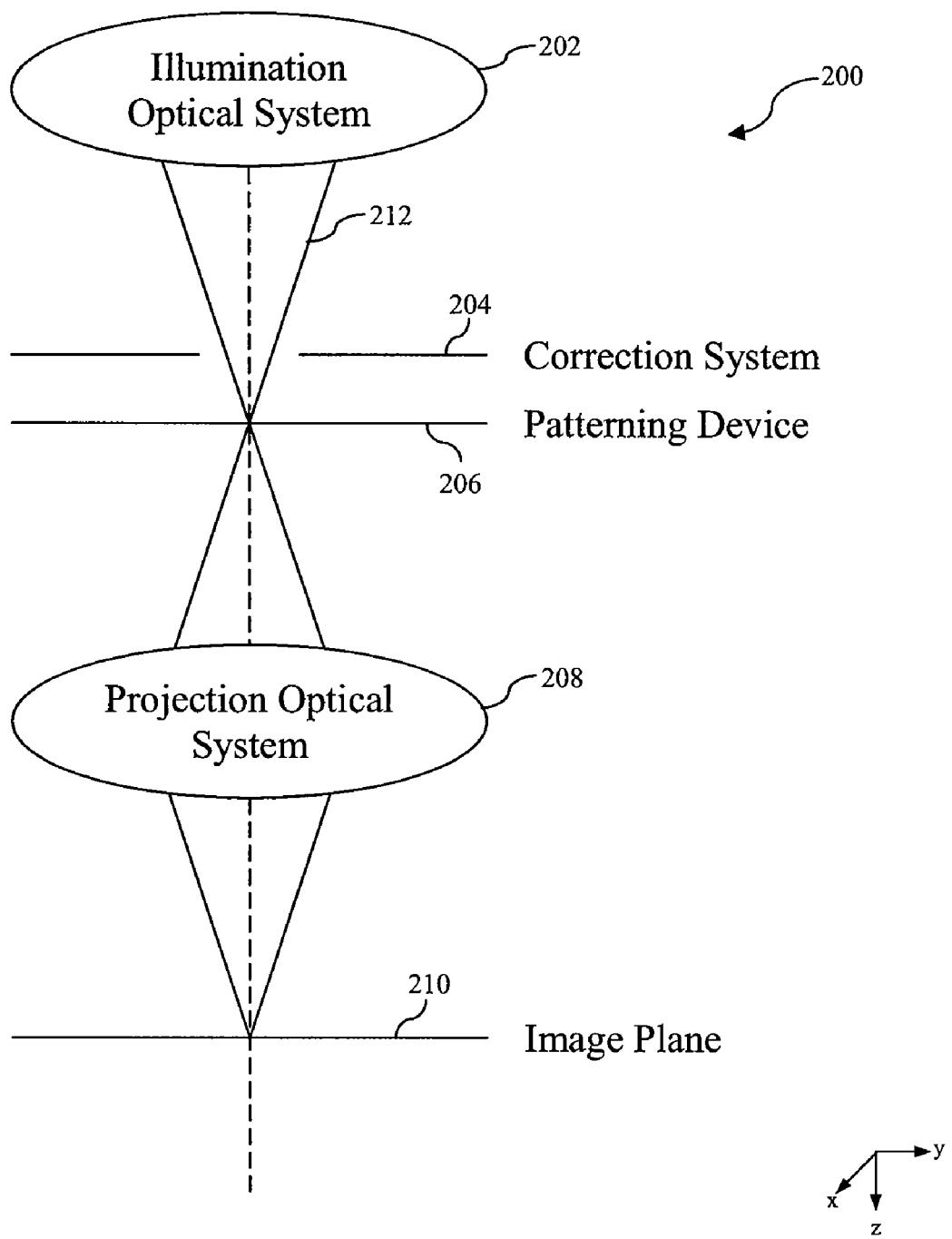
FIG. 2 illustrates an exemplary lithography scanner having an ellipticity and uniformity correction system.

FIG. 2 is an illustration of an exemplary lithography system 200. In an embodiment, lithography system 200 is a system using a reticle or mask. In an alternate embodiment, system 200 is a maskless lithography system.

Lithography system 200 includes, along a light path, an illumination optical system 202, an ellipticity correction system 204, a patterning device (also referred to herein as a contrast device) 206, a projection optical system 208, and an image plane 210.

Illumination optical system 202 outputs an illumination beam 212. In an embodiment, illumination optical system 202 defines a field or slit, which is scanned across patterning device 206. Illumination optical system 202 may use any type of illumination (e.g., quadrupole, annular, etc.) as required by the lithography system. In addition, illumination optical system 202 may support the modification of various illumination properties, such as partial coherence or fill geometry. The details of illumination systems are well known to those skilled in the art and thus are not explained further herein.

Ellipticity correction system 204 may be positioned between illumination optical system 202 and patterning device 206 at a defocus position. As will be described further with respect to FIGS. 3 through 6, ellipticity correction system 204 includes a light attenuating filter having a pattern that corrects ellipticity in the illumination beam and reduces the effect of ellipticity variations across the field. If the filter is located at an image plane of the illumination system, it will have no effect on the angular distribution of light (in other words, there is no effect on the pupil). However, if the filter is located at a defocus position of the illumination system, the filter can interact with the distribution of light (in other words, there is an effect on the pupil). In one example, ellipticity correction system 204 is located proximate to (e.g., within approximately 5 mm to approximately 60 mm of) patterning device 206. In another example, ellipticity correction system 204 is placed at another location, such as a defocus position between illumination optical system 202 and an intermediate image plane (not shown). The intermediate image plane may be, for example, a REMA (reticle edge masking assembly) plane located in front of a REMA lens. Additionally, the position of ellipticity correction system 204 may be adjustable in the Z direction (i.e., the direction of illumination), as long as it remains at a defocus position. Ellipticity correction system 204 may be adjusted, for example, to optimize the quality and/or accuracy of the ellipticity correction.

Ellipticity correction system 204 may be implemented as a stand-alone device. Alternatively, ellipticity correction system 204 may be incorporated into a uniformity correction system for use in lithography systems. An exemplary uniformity correction system is described in U.S. patent application Ser. No. 11/295,517, filed Dec. 7, 2005, and titled "System and Method for Uniformity Correction," to the same assignee as the present application, which is incorporated herein by reference in its entirety. Such a uniformity correction system may be used at the same defocus position as ellipticity correction system 204. If ellipticity correction system 204 is combined with such a uniformity correction system, the light attenuating filter may be placed in the center of the uniformity correction system with attenuating elements used by the uniformity correction system being inserted at one or more edges of the filter. The effects on ellipticity produced by the attenuating elements of the uniformity correction system can be taken into consideration when the ellipticity-correcting filter pattern is calculated.

In a first embodiment, patterning device 206 is a reticle. In a second, maskless embodiment, patterning device 206 is a programmable array of individually controllable elements. The programmable array may include a suitable reflective device, such as a micro-mirror array. Alternatively, the programmable array is a transmissive device, such as a liquid crystal display ("LCD").

Projection optical system 208 is configured to project a patterned image formed by patterning device 206 onto image plane 210. The details of projection optical system 208 are dependent upon the type of lithography system used. Specific functional details of projection optics are well known to those skilled in the art and therefore are not explained further herein.

A substrate (not shown) may be placed at image plane 210. The substrate may be, for example and without limitation, a wafer, a piece of glass, a flat panel display, or the like. Alternatively, when a substrate is not present, an ellipticity detection system (not shown) may be placed at image plane 210. The ellipticity detection system detects and/or measures the angular light distribution profile of one or more points in the illumination field at image plane 210, which can then be used to determine the filter pattern for ellipticity correction system 204. This may be used, for example, in a feedback loop to one of the previous elements of the lithography systems, or in a feedforward loop to a subsequent element, to correct for the ellipticity at one or more points of the illumination field.

Figure 3:
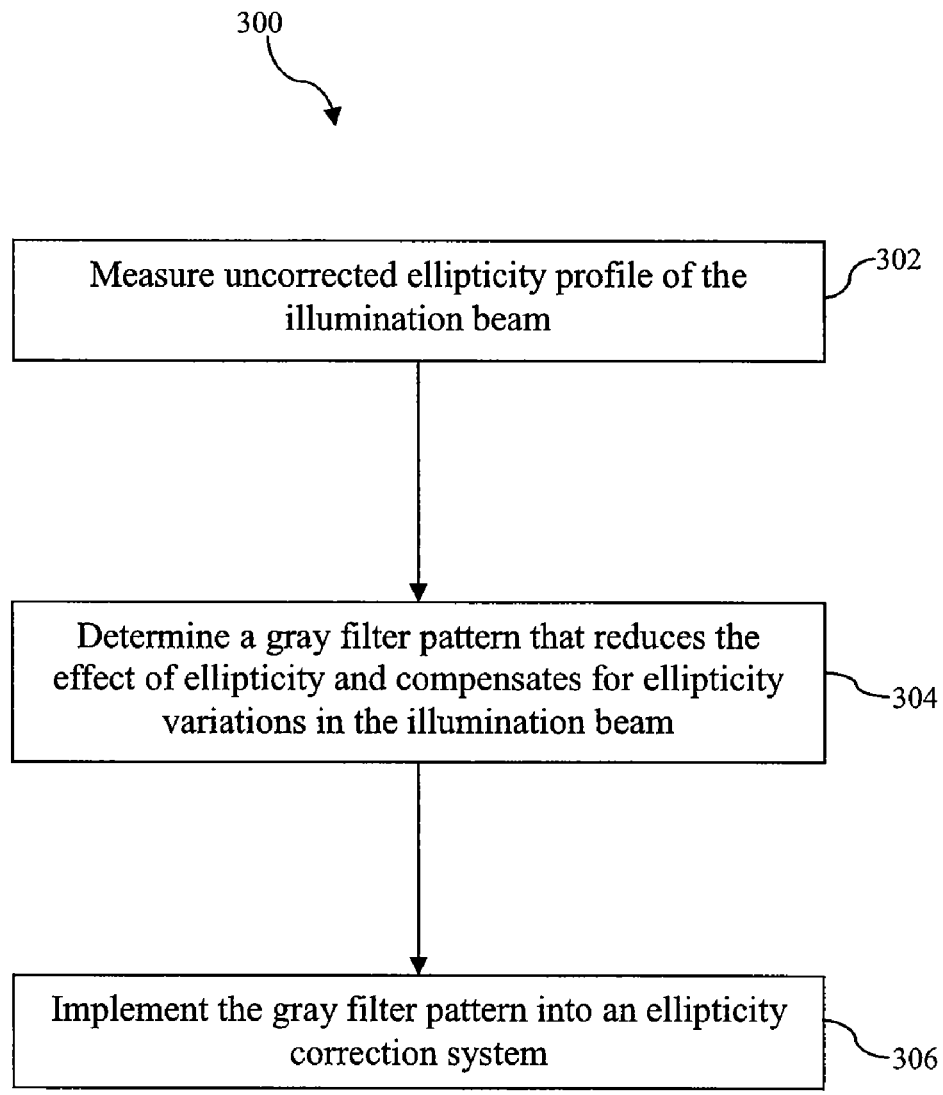
FIG. 3 is an exemplary method for correcting ellipticity in a lithography system.

FIG. 3 is a flowchart of an exemplary method 300 for correcting ellipticity in an illumination beam of a lithography system. Although the present description discusses correcting variations in ellipticity, one of skill in the art will recognize that the ellipticity correction system may be used to correct other illumination errors that affect imaging performance, such as telecentricity (that is, pupil asymmetry) and intensity variations.

In step 302, an uncorrected ellipticity profile of the illumination beam is measured. Such a measurement can be made by, for example, placing a pupil detector at an image plane of the lithography system. In one embodiment, the uncorrected ellipticity profile is measured by determining an angular distribution of light at multiple positions within the image (or object) field.

In step 304, a light attenuating filter pattern is determined that reduces the effect of ellipticity in the illumination beam and/or compensates for ellipticity variations across the illumination field. The filter pattern may be based on, for example, a previously-calibrated map or model of filter pattern features versus ellipticity errors over a range of cross-scan coordinates in the defocused area.

Figure 8:
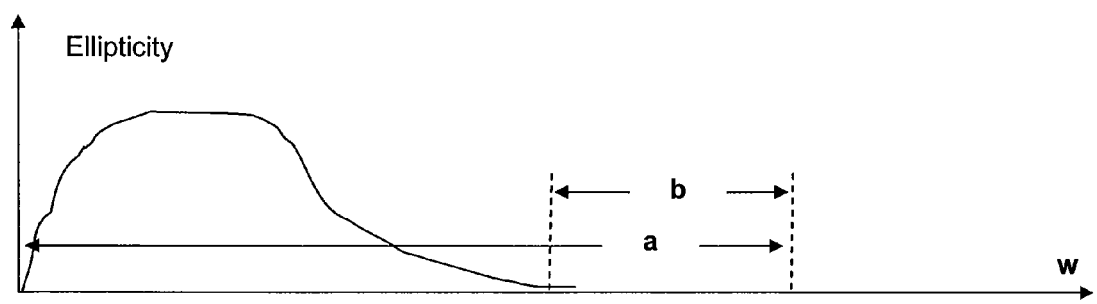
FIG. 8 is a model of ellipticity correction versus width of light attenuation.
Figure 9:
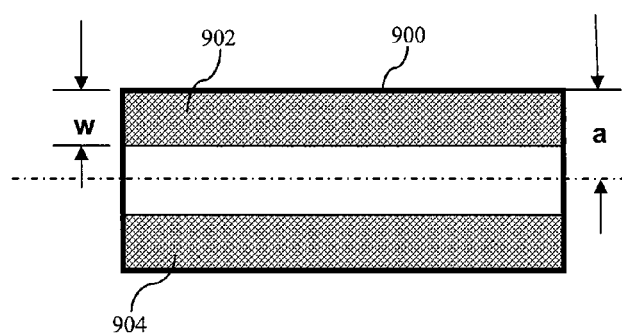
FIG. 9 is an exemplary filter for modeling ellipticity correction versus width of light attenuation.

FIG. 8 is an example model that identifies the dependence between a width of light attenuation (e.g., the gray portion of a filter) from the edge of the gray filter and induced ellipticity in the pupil, averaged along the scan direction. FIG. 9 is an exemplary filter 900 having a symmetrical pattern of light attenuating areas 902 and 904 stretching from the edges of filter 900 toward the center of filter 900. Filter 900 may be used to develop the model of FIG. 8. In FIGS. 8 and 9, w is the width of the light attenuation, a is the distance from the edge of the field to the center of the field, and b is the area of the field having minimal effect on ellipticity.

In FIG. 8, the attenuation at increasing distances from the edge of the field in the scan direction (i.e., the width of attenuation) is illustrated along the horizontal axis. As illustrated, light attenuation has the strongest effect on ellipticity at the edges of the field. Initially, as the width of the light attenuating area increases, the induced ellipticity also increases. Eventually, the effect on induced ellipticity reaches saturation and begins to drop, reaching zero before the light attenuating area reaches the central line of the filter. To correct ellipticity, then, the value of ellipticity correction needed at a given coordinate can be matched to a light attenuating area width for implementation on the filter. If no ellipticity correction is needed, a light attenuating area can be applied in the center of the filter, from the central line to the point where induced ellipticity reaches zero (area b), without any corresponding effect on ellipticity. In this manner, light attenuating area widths and locations can be determined for multiple scan lines, which can then be combined to produce a light attenuating filter pattern in step 304 of method 300 (FIG. 3).

Figure 10:
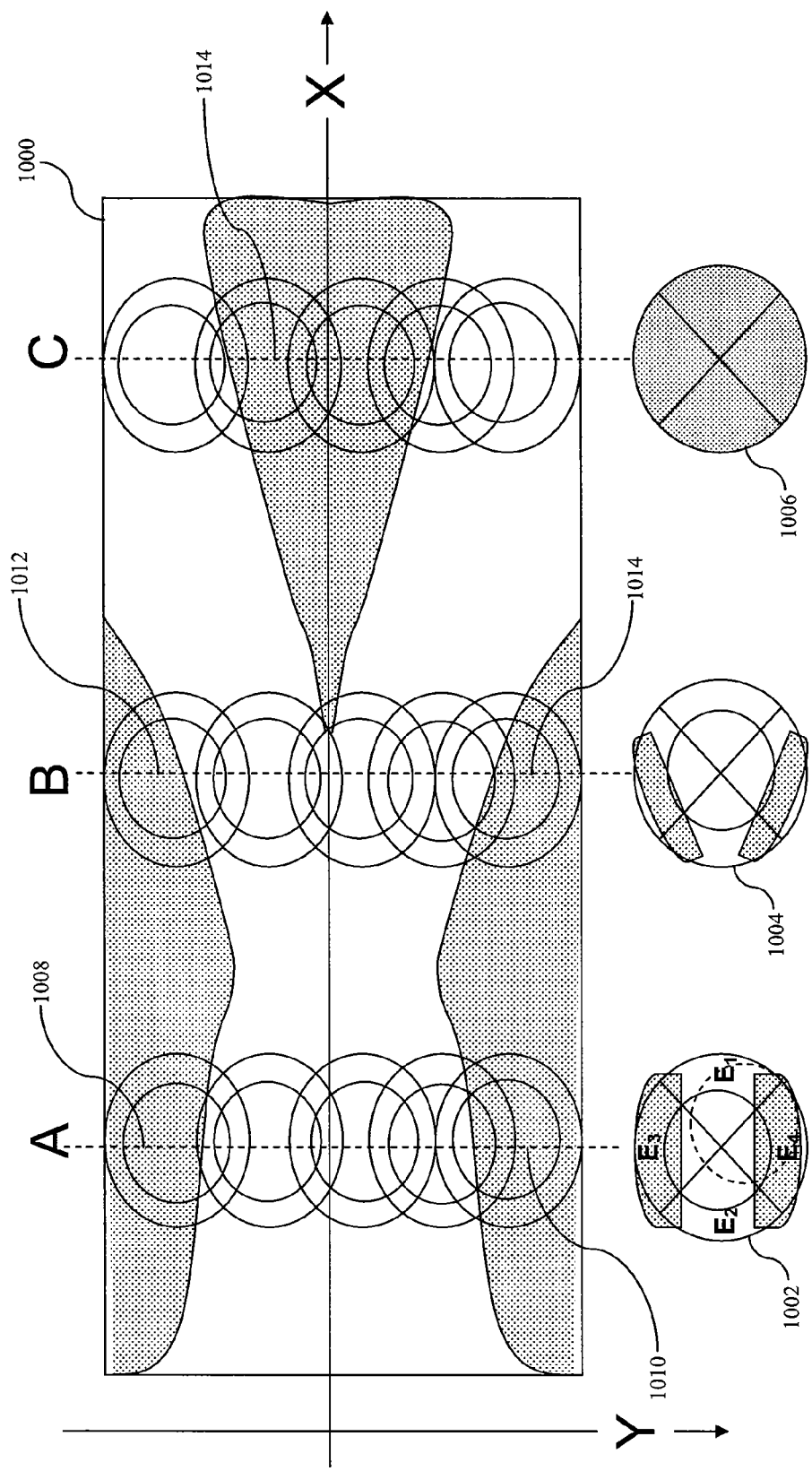
FIG. 10 is an exemplary filter having a pattern for correcting variations in ellipticity.

The effect on ellipticity produced by a given filter pattern is further illustrated in FIG. 10 by filter 1000. Each of lines A, B, and C represent scan lines across filter 1000. In lithography, ellipticity for an individual pupil is not as important as the average pupil ellipticity in the scan direction. In other words, reference to the ellipticity at a certain point in the field means the amount of ellipticity for a given cross-scan (X) position in a pupil averaged along the scan (Y) direction, corresponding to the value of the given cross-scan (X) position. Pupils 1002, 1004, and 1006 represent the average pupils along each of lines A, B, and C, respectively.

For purposes of this example, without the filter there is strong ellipticity along scan line A, moderate ellipticity along scan line B, and no ellipticity along scan line C. In pupil 1002, without correction the energy in quadrants 1 and 2 is significantly different than in quadrants 3 and 4. The filter pattern for ellipticity correction along scan line A therefore has relatively wide light attenuating areas 1008 and 1010 at the edges of the pattern for the cross-scan (X) position of scan line A. Since pupil 1004 has only a moderate ellipticity, the correction does not need to be as strong, and the light attenuating areas 1012 and 1014 at the edges of the pattern for the cross-scan position of scan line B are relatively narrow compared to that of scan line A. Since pupil 1006 has no ellipticity, no ellipticity correction is needed and there is no light attenuating area at the edges of the pattern for the cross-scan position of scan line C.

If the filter pattern is needed to correct ellipticity but not uniformity (uniformity being the energy distribution across all points in the field), the total integrated attenuation along each of scan lines A, B, and C should be approximately the same. That is, for each scan line, the integral of each scan line should have approximately an equal level of attenuation (e.g., 3% attenuation, 5% attenuation, etc.) (also referred to as the total scanned optical density). In an example where each scan line should have an attenuation of approximately 5%, the attenuation can be applied in various places along the scan line. For example, if the 5% attenuation is applied in the center of the field, then there will be no effect on ellipticity. If 2.5% attenuation is applied on one edge of the field and another 2.5% attenuation is applied on an opposite edge of the field, there will be an effect on ellipticity.

In FIG. 10, the pupil in scan line C does not exhibit any ellipticity, and does not need to be corrected. However, the integrated attenuation of scan line C does need to be equal to the integrated attenuation of, for example, scan lines A and B so that there is no adverse affect on uniformity. Attenuation 1014 can be applied in the center of the field along scan line C to equate the integrated attenuation of scan line C without affecting the ellipticity of scan line C.

If the filter pattern is to correct both ellipticity and uniformity, the total integrated attenuations of various scan lines across the field may be different. For example, one scan line may have a total integrated attenuation of 2%, another scan line may have a total integrated attenuation of 5%, and still another scan line may be completely transparent with a total integrated attenuation of 0%.

Figure 4:
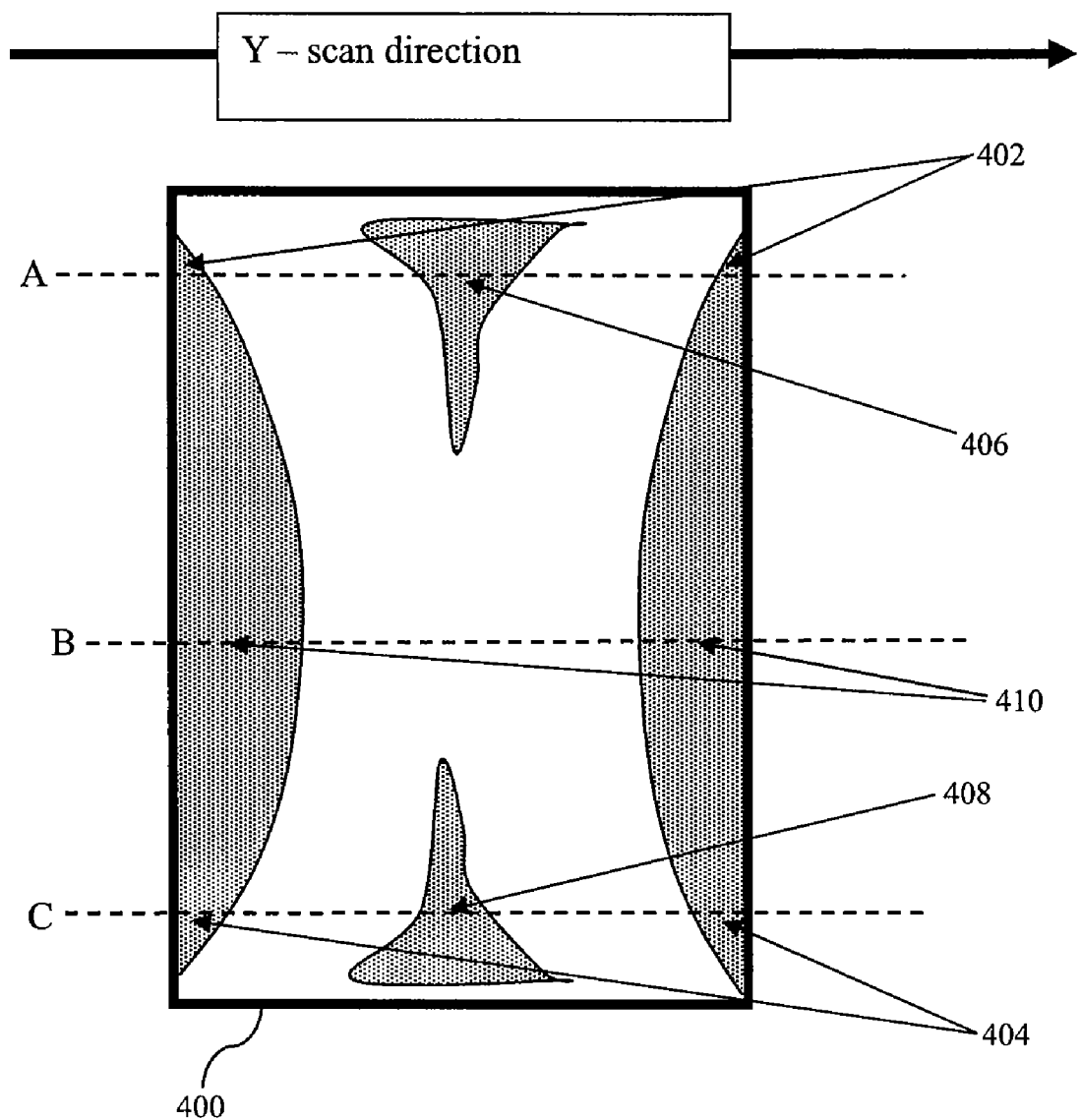
FIGS. 4 and 5 are exemplary light attenuating filter patterns for ellipticity correction.
Figure 5:
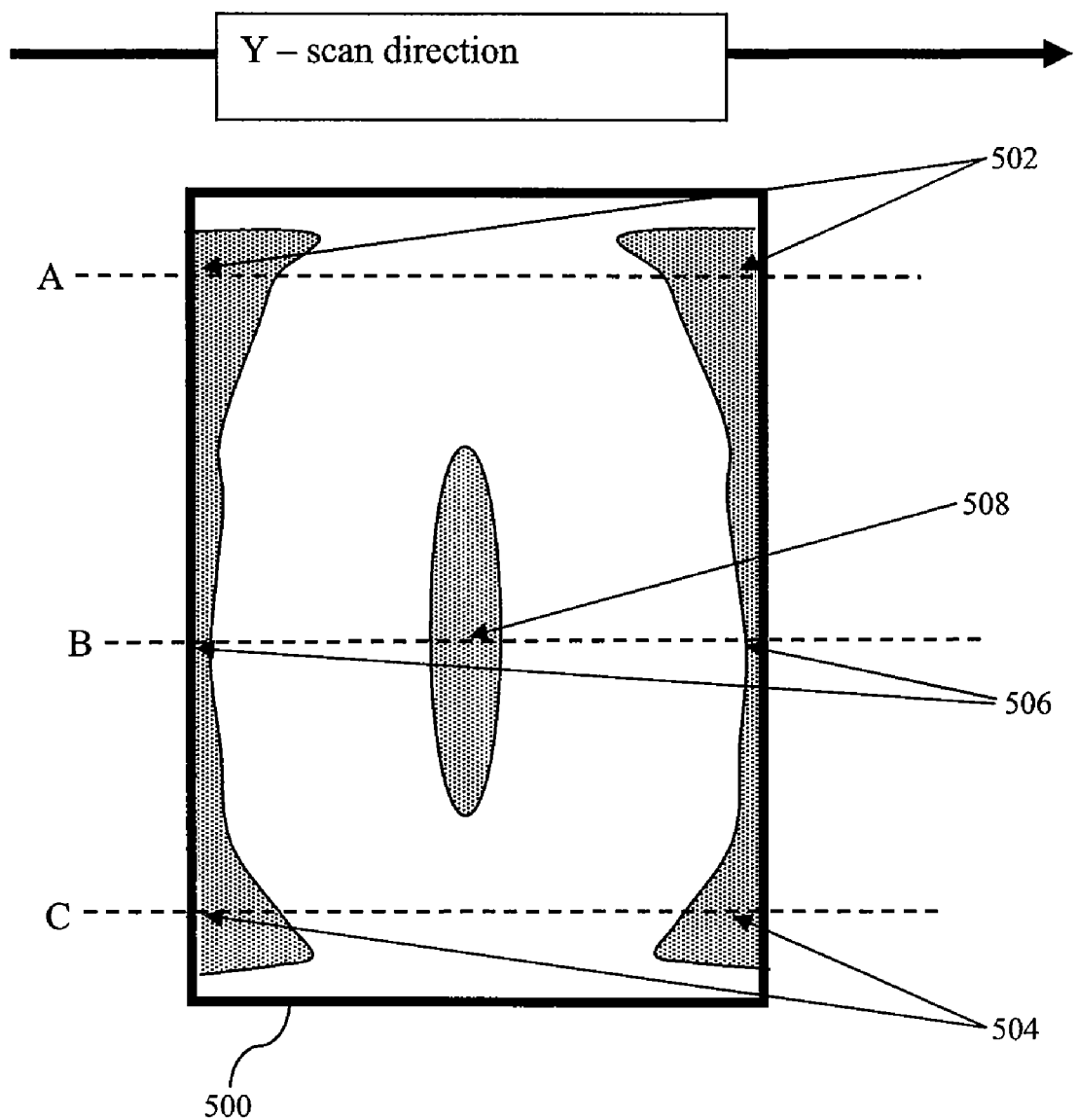
Figure 6:
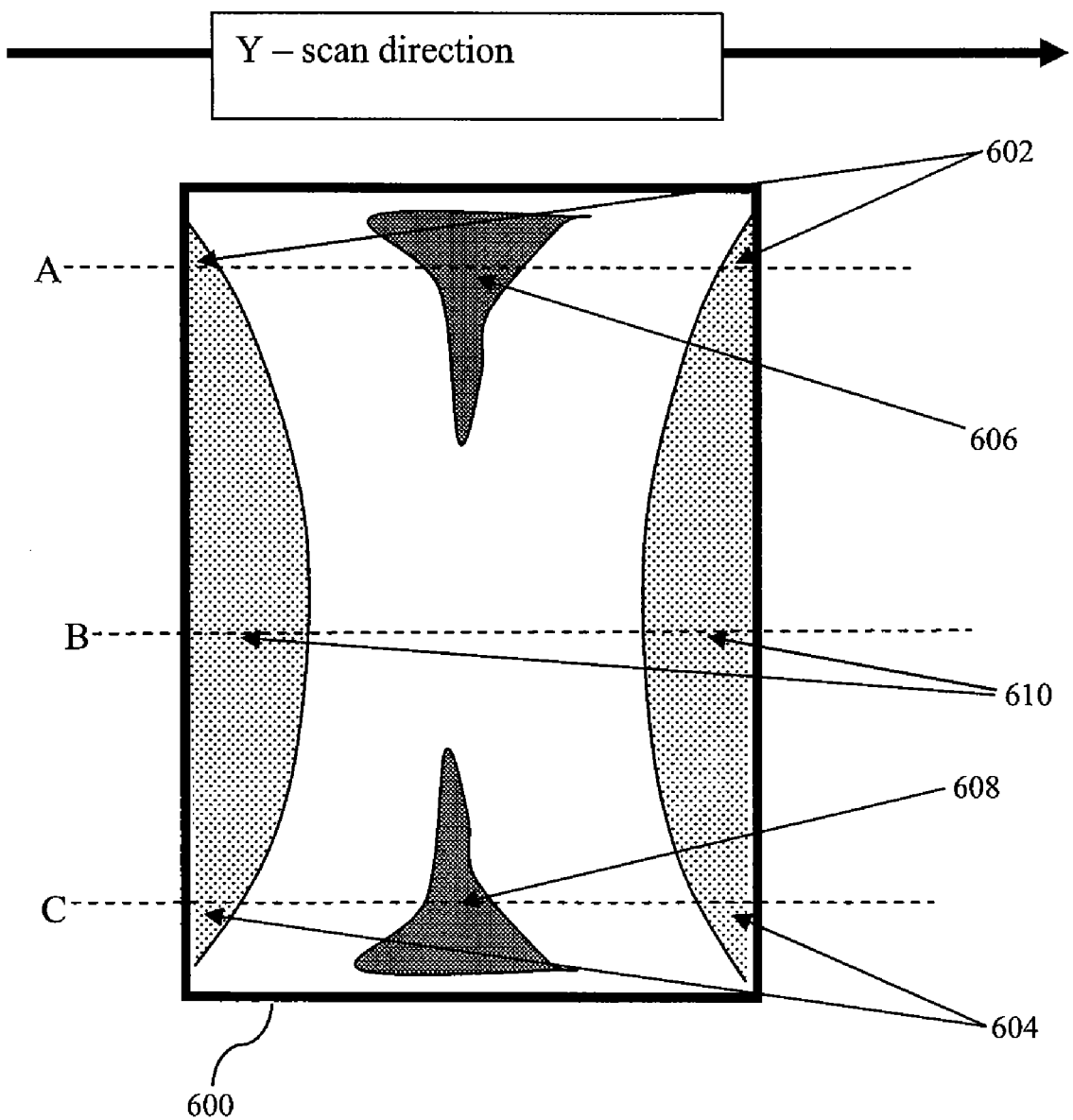
FIG. 6 is an exemplary light attenuating filter pattern that corrects ellipticity and uniformity simultaneously.

Example filter patterns for various combinations of ellipticity and uniformity corrections are illustrated in FIGS. 4, 5, and 6.

FIG. 4 is an illustration of an exemplary light attenuating filter pattern 400 that corrects ellipticity without affecting the uniformity of the illumination field. Each of lines A, B, and C represent scan lines across pattern 400. Pattern 400 may be used, for example, to correct an ellipticity that occurs in the middle of the illumination field and varies as a function of the cross scan direction. Light attenuating features 402 on scan line A and light attenuating features 404 on scan line C represent areas where ellipticity correction is low due to the relatively narrow width of the light attenuating features from the edges of the illumination field. Light attenuating features 410 on scan line B represent areas where ellipticity correction is high due to the relatively wide width of the light attenuating features from the edges of the illumination field. Light attenuating feature 406 on scan line A and light attenuating feature 408 on scan line C represent areas where there is no ellipticity correction, but attenuation is needed to reduce adverse effects on uniformity. In pattern 400, each of light attenuating features 402, 404, 406, 408, and 410 have approximately the same optical density, so the total integrated attenuation along each of scan lines A, B, and C is approximately equal and uniformity is not affected.

FIG. 5 represents another exemplary light attenuating filter pattern 500 that corrects ellipticity without affecting the uniformity of the illumination field. Again, each of lines A, B, and C represent scan lines across pattern 500. Pattern 500 may be used, for example, to correct an ellipticity that occurs at the ends of the illumination field and varies as a function of the cross scan direction. Light attenuating features 502 on scan line A and light attenuating features 504 on scan line C represent areas where ellipticity correction is high due to the relatively wide width of the light attenuating features from the edges of the illumination field. Light attenuating features 506 on scan line B represent areas where ellipticity correction is low due to the relatively narrow width of the light attenuating features from the edges of the illumination field. Light attenuating feature 508 on scan line B represents an area where there is no ellipticity correction, but attenuation is needed to prevent effects on uniformity. For example, in pattern 500, each of light attenuating features 502, 504, 506, and 508 have approximately the same optical density, so the total integrated attenuation along each of scan lines A, B, and C is approximately equal and uniformity is not affected.

FIG. 6 represents an exemplary light attenuating filter pattern 600 that corrects both ellipticity and uniformity of the illumination field, even when variations in the ellipticity do not follow the uniformity variation trend. Each of lines A, B, and C represent scan lines across the pattern. Pattern 600 may be used, for example, to correct an ellipticity that occurs in the middle of the illumination field and that varies as a function of the cross scan direction, as well as a non-uniformity that rolls off to the ends of the illumination field in the cross scan direction. Light attenuating features 602 on scan line A and light attenuating features 604 on scan line C represent areas where ellipticity correction is low due to the relatively narrow width of the light attenuating features from the edges of the illumination field. Light attenuating features 610 on scan line B represent areas where ellipticity correction is high due to the relatively wide width of the light attenuating features from the edges of the illumination field.

In FIGS. 4 and 5, all light attenuating features on the filter pattern have approximately the same optical density, and the pattern does not affect uniformity of the illumination beam. In FIG. 6, however, light attenuating features 606 and 608 have a higher optical density than light attenuating features 602, 604, and 610. This differentiation in optical density causes a change in the uniformity of the illumination beam. Specifically, since light attenuating features 606 and 608 have a higher optical density, a non-uniform roll-off to the ends of the illumination field is created in the cross scan direction. This can counteract existing non-uniformities in the illumination beam, such that a more uniform illumination beam results. Additionally, since light attenuating features 606 and 608 are located in the center of the field in the scan direction, they do not affect the ellipticity along scan lines A and C, respectively.

In this manner, using the width of the light attenuating area, the optical density of the light attenuating area, and the location of the light attenuating area for every cross-scan position (value of X), it is possible to achieve a variety of induced ellipticities of averaged pupils and total energy in the scan direction. In other words, it is possible to alter both ellipticity and uniformity at the same time or independently.

Returning to FIG. 3, in step 306, the filter pattern determined in step 304 is implemented into the ellipticity correction system. The filter pattern may be implemented in a variety of ways. In one example, the filter pattern is printed on a material that is transparent to light at the operating wavelength of the lithography system. For instance, if the operating wavelength of the lithography system is 193 nm, the material may be fused silica. Light attenuating areas may be implemented on the material using an assembly of microscopic dots. Areas needing a higher optical density may have dots that are located close together, so that they block more light. Areas needing a lower optical density may have dots that are located farther apart, so that they block less light. The dots may be made of any material capable of blocking and/or attenuating light at the operating wavelength, such as chrome.

In another example, the filter pattern is implemented using a continuous, semitransparent film. This film is imprinted with the gray filter pattern, and may be used on its own or as an overlay on a material transparent to light at the operating wavelength of the lithography system.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A system for reducing ellipticity in an illumination beam, comprising:
   an illumination optical system configured to produce an illumination beam; and
   a light attenuating filter located at a defocus position of the illumination beam, the filter including a two-dimensional pattern that compensates for ellipticity variations in corresponding areas of the illumination beam, wherein a first dimension of the two-dimensional pattern is in a scan direction and a second dimension of the two-dimensional pattern is in a cross-scan direction,
   wherein the two-dimensional pattern includes a light attenuating feature that is a first width in the scan direction if a lower effect on ellipticity is needed for a corresponding cross-scan position and a second width in the scan direction, the second width being larger than the first width, if a higher effect on ellipticity is needed for a corresponding cross-scan position.

2. The system of claim 1, wherein the filter is located within Approximately 5 mm to approximately 60 mm from a focal plane.

3. The system of claim 1, wherein the filter is configured such that total optical density remains substantially unchanged at each point on the filter.

4. The system of claim 1, wherein the filter is configured such that total scanned optical density across the filter is adjusted by a variation in optical density at one or more points on the filter.

5. The system of claim 1, wherein the two-dimensional pattern of the filter is configured to compensate for uniformity variations in the illumination beam.

6. The system of claim 1, wherein the two-dimensional pattern of the filter is configured to correct ellipticity in the illumination beam while avoiding changes in uniformity of the illumination beam.

7. The system of claim 1, further comprising a uniformity correction system located at the defocus position of the illumination beam.

8. The system of claim 7, wherein the filter is incorporated into the uniformity correction system.

9. The system of claim 1, further comprising:
   a patterning device configured to pattern the illumination beam after it has transmitted through the filter; and
   a projection system that is configured to project the patterned beam onto target positions of a substrate.

10. The system of claim 1, wherein the filter is adjustable along a path produced by the illumination beam.

* * * * *

UNITED STATES PATENT AND TRADEMARK OFFICE
CERTIFICATE OF CORRECTION

| | | |
|---|---|---|
| PATENT NO. | : 7,843,549 B2 | Page 1 of 1 |
| APPLICATION NO. | : 11/752710 | |
| DATED | : November 30, 2010 | |
| INVENTOR(S) | : Alexander Kremer | |

It is certified that error appears in the above-identified patent and that said Letters Patent is hereby corrected as shown below:

Claim 2, column 9, line 21, please delete "Approximately" and replace with --approximately--.

Signed and Sealed this
First Day of March, 2011

David J. Kappos
*Director of the United States Patent and Trademark Office*